United States Patent [19]

Oster

[11] Patent Number: 5,440,918
[45] Date of Patent: Aug. 15, 1995

[54] PORTABLE PIPING-AND-PUMP-SYSTEM TESTING APPARATUS

[76] Inventor: Earl H. Oster, Rte. 1, Box 44, Beulah, N. Dak. 58523

[21] Appl. No.: 229,029

[22] Filed: Apr. 18, 1994

[51] Int. Cl.⁶ .............................................. G01M 3/28
[52] U.S. Cl. ................................................. 73/40.5 R
[58] Field of Search ................. 73/40.5 R, 49.2, 865.9

[56] References Cited

U.S. PATENT DOCUMENTS

| | | | |
|---|---|---|---|
| 3,756,072 | 9/1973 | MacMurray | 73/40.5 R |
| 4,114,426 | 9/1978 | McLean | 73/40.5 R |
| 4,918,968 | 4/1990 | Hoffman | 73/40 |
| 5,042,290 | 8/1991 | Geisinger | 73/40.5 R |
| 5,092,158 | 3/1992 | Tuma et al. | 73/40.5 R |
| 5,201,212 | 4/1993 | Williams | 73/40.5 R |

*Primary Examiner*—Hezron E. Williams
*Assistant Examiner*—Michael J. Brock
*Attorney, Agent, or Firm*—David A. Lingbeck

[57] ABSTRACT

This invention relates to a portable piping-and-pump-system testing apparatus comprising a cabinet having a hinged lid and a front wall and having a supply tank for holding liquid comparable to the liquid in the piping and pump system being tested and further having a leakage detector adapter for receiving a leakage detector for the testing thereof and also having a calibrated cylinder mounted on a base member which is hingedly mounted to a bracket and having a control panel comprising a series of pressure gauges, regulators, and valves to conduct the tests of the leakage detector either in the piping and pump system or in the leakage detector adapter or to conduct tests for line leaks in the piping and pump system by using the supply tank and calibrated cylinder to monitor drop of liquid in the cylinder over a preset period of time.

9 Claims, 5 Drawing Sheets

PORTABLE PIPING-AND-PUMP-SYSTEM TESTING APPARATUS

BACKGROUND OF THE INVENTION

This invention relates to a portable piping-and pump-system testing apparatus which tests leakage detectors used in such systems and which, optionally, tests for line leaks in such systems.

Leakage test equipment is used and needed to protect the environment from toxic fluids which may leak through pipes and seep into the ground effecting damage to the ground water as such and also effecting waste of a valuable resource used for production of energy. With the advent of storing toxic fluids underground and with the environmental agencies policing environmental problems effected by toxic fluids spilling into the ground and contaminating the water supply, different types of single function leakage testing equipment have be conceived.

One known prior art is a PORTABLE LEAK TEST INSTRUMENT, U.S. Pat. No. 3,756,072, which comprises a tank containing an inert gas and connected through a pre-set pressure regulator to a first pressure indicating gauge and a line which is a adapted to be coupled to the closed system to be tested.

Another known prior art is a LIQUID VOLUMETRIC LINE LEAK TESTING APPARATUS AND METHOD, U.S. Pat. No. 3,910,102, which comprises a calibrated burette which is connected to the pump system and which delivers fluid product to the pump system and registers over a selected period of time the change in the level of fluid product in the burette.

Another known prior art is a LIQUID VOLUMETRIC LINE LEAK TESTING APPARATUS, U.S. Pat. No. 4,114,426, which comprises a calibrated burette, a funnel for filling the burette to a pre-determined level, a hand-operated pump, a pressure gauge, an air bleed device, and a permanent magnet all which are contained in a case.

Another known prior art is an APPARATUS AND METHOD OF DETECTING LEAKS IN PRESSURIZED PIPING SYSTEMS, U.S. Pat. No. 4,918,968, which comprises a fill cylinder and a pressure cylinder mounted on a frame. The fill cylinder has a moveable liquid-tight piston, valve ports on one side of the piston, and a vent port on the other side. The pressure cylinder includes a moveable pressure piston, a pressure regulator in communication with one side of the piston and an access port on the opposite side. A connecting rod interconnects the two pistons and a pointer connected to the rod registers on a calibrated scale.

Another known prior art is a GAS LEAKAGE DETECTOR, U.S. Pat. No. 4,998,434, which comprises a housing, an inlet coupling, internal fluid flow path and an outlet coupling enabling the housing to be installed and coupled permanently in-line with the supply line.

Another prior art is an ISOLATOR FOR LEAK DETECTOR TESTER, U.S. Pat. No. 5,042,290, which comprises an isolator selectively mountable in the seat of the housing, means for mounting the leak detector in the isolator, means for interconnecting through the isolator the outflow from the submerged pump with an inlet to the mounted leak detector, and a tap for discharging fuel flow from the leak detector.

Another known prior art is an APPARATUS FOR TESTING LEAK DETECTORS, U.S. Pat. No. 5,092,158, which comprises a pressurized tank, a mount for receiving the leak detector, a capillary tube extending into the tank, a manifold, and a plurality of flow restrictors.

Another known prior art is a LINE LEAK DETECTOR AND METHOD, U.S. Pat. No. 5,201,212, which comprises means for measuring the temperature of the liquid in the line, means for measuring the temperature and pressure of the liquid in a test reservoir, and means for receiving the signals from said measuring means.

Each of the above-identified patents describes apparatuses and test equipments which perform a single function meaning that in order for a complete test to be performed on a pipe and pump system which includes conducting a test on the leakage detectors in the system, conducting a test on the leakage detectors out of the system, and conducting a line leakage test, the user would need multiple test equipment to perform the tests. There is a definite need for an apparatus which can perform a complete test on a given pipe and pump system without having to use multiple apparatuses.

SUMMARY OF THE INVENTION

The present invention relates to a portable piping-and-pump-system testing apparatus for testing leakage detectors and possibly testing for line leaks which comprises a cabinet having a hinged front wall and a hinged lid; a supply tank for storing liquid compatible to the test being conducted; a leakage detector adapter; a control panel comprising a plurality of control valves, gas and liquid regulators, pressure gauges, coupling hoses, and a T-coupler to interconnect the control valves; the leakage detector adapter; the supply tank; and, optionally, a calibrated cylinder for testing for line leaks all self-contained in the cabinet which has handle means for ease of moving the portable piping-and-pump-system testing apparatus which allows the user to test the leakage detector and test for line leaks simultaneously.

An objective of the present invention is to produce a self-contained portable test unit which will perform all the required tests on a pipe and pump system such as found at gasoline stations.

Another objective of the present invention is to produce a self-contained portable test unit which can conduct line leak tests and leakage detector tests without having to actuate the pump system being tested.

Further, another objective of the present invention is to produce a self-contained portable test unit which can perform line leak tests and leakage detector tests simultaneously.

Yet, another objective of the present invention is to produce a self-contained portable test unit which can be easily carried by the user to the system being tested.

Further objects and advantages of the present invention will become apparent as the description proceeds and when taken in conjunction with the accompanying drawings wherein:

DETAILED DESCRIPTION OF THE INVENTION

Figure 1:
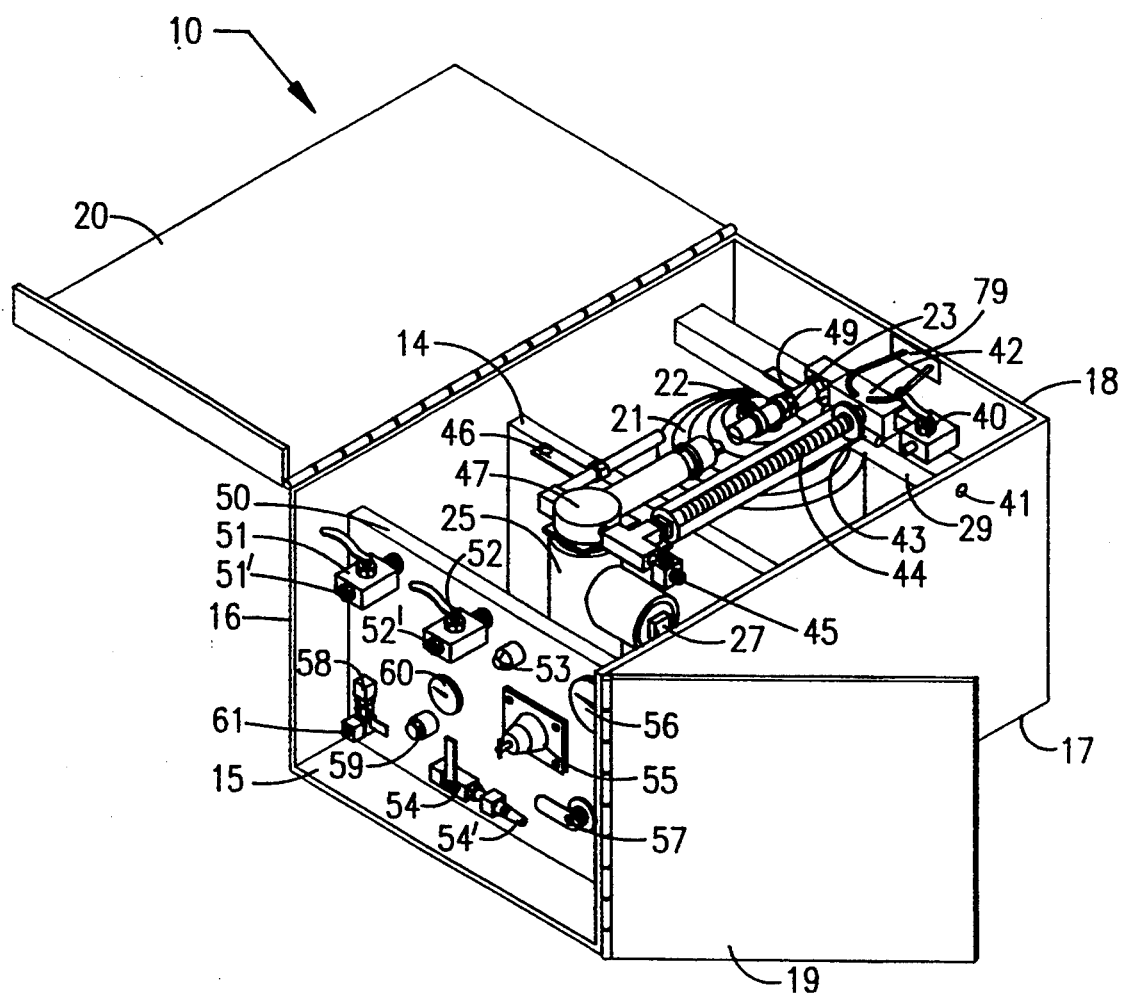
FIG. 1 is a top perspective view of the portable piping-and-pump-system testing apparatus with the calibrated cylinder nonoperatively disposed for travel.
Figure 2:
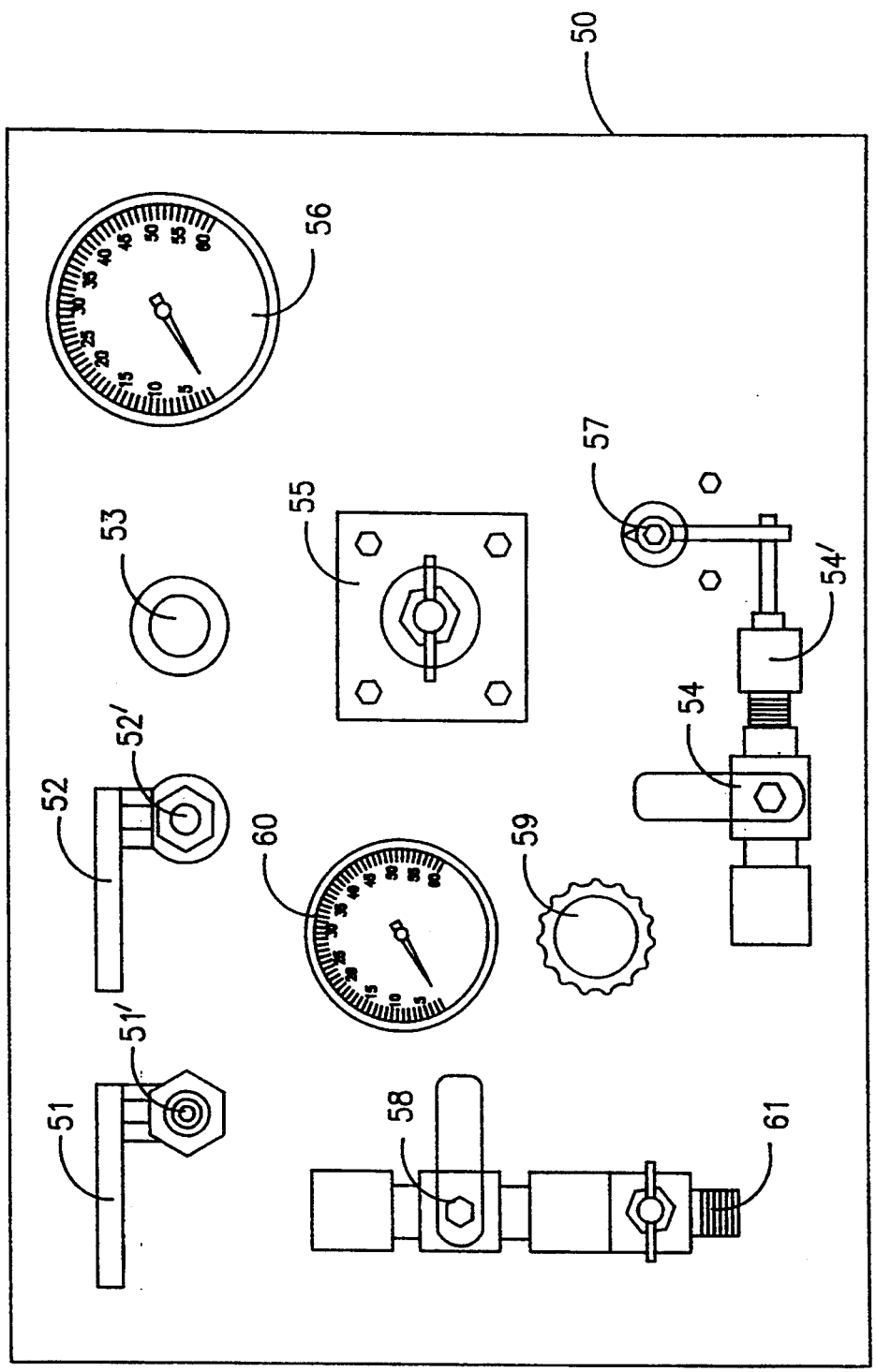
FIG. 2 is a front elevation view of the portable piping-and-pump-system testing apparatus.

Referring to the drawings in FIGS. 1 through 5, the piping-and-pump-system testing apparatus comprises a portable cabinet 10 having two side walls 16 & 17, a bottom wall 15, a back wall 18, a hinged front wall 19, a divider wall 14 fixedly attached to the two side walls 16 & 17 with screws or the like, and a hinged lid 20, and further having handles on the exterior of the back wall 18 and front wall 19 to facilitate carrying of the cabinet 10. A supply tank satisfying all the environmental protection laws for storing volatile liquids and preferably capable of containing up to 2.75 gallons of liquid is securely mounted inside the cabinet 10 upon the bottom wall 15 thereof with fasteners such as bolts or the like. The supply tank 21 preferably has an liquid inlet and bleed valve 22 disposed in the top of the tank for filling the tank with a volatile liquid from an outside liquid dispensing source and further has a gas inlet valve 23 which is also disposed in the top of the tank for pressurizing the inside of the supply tank 21 and also has an liquid outlet fitting 24 disposed in the bottom of the supply tank 21 to dispense the liquid from the supply tank 21 conduct the leakage detector test and line leak test. A supply tank 21 hose is connected to the liquid outlet 24 disposed in the bottom of the supply tank 21 and has a connection fitting at the opposite end thereof.

Figure 3:
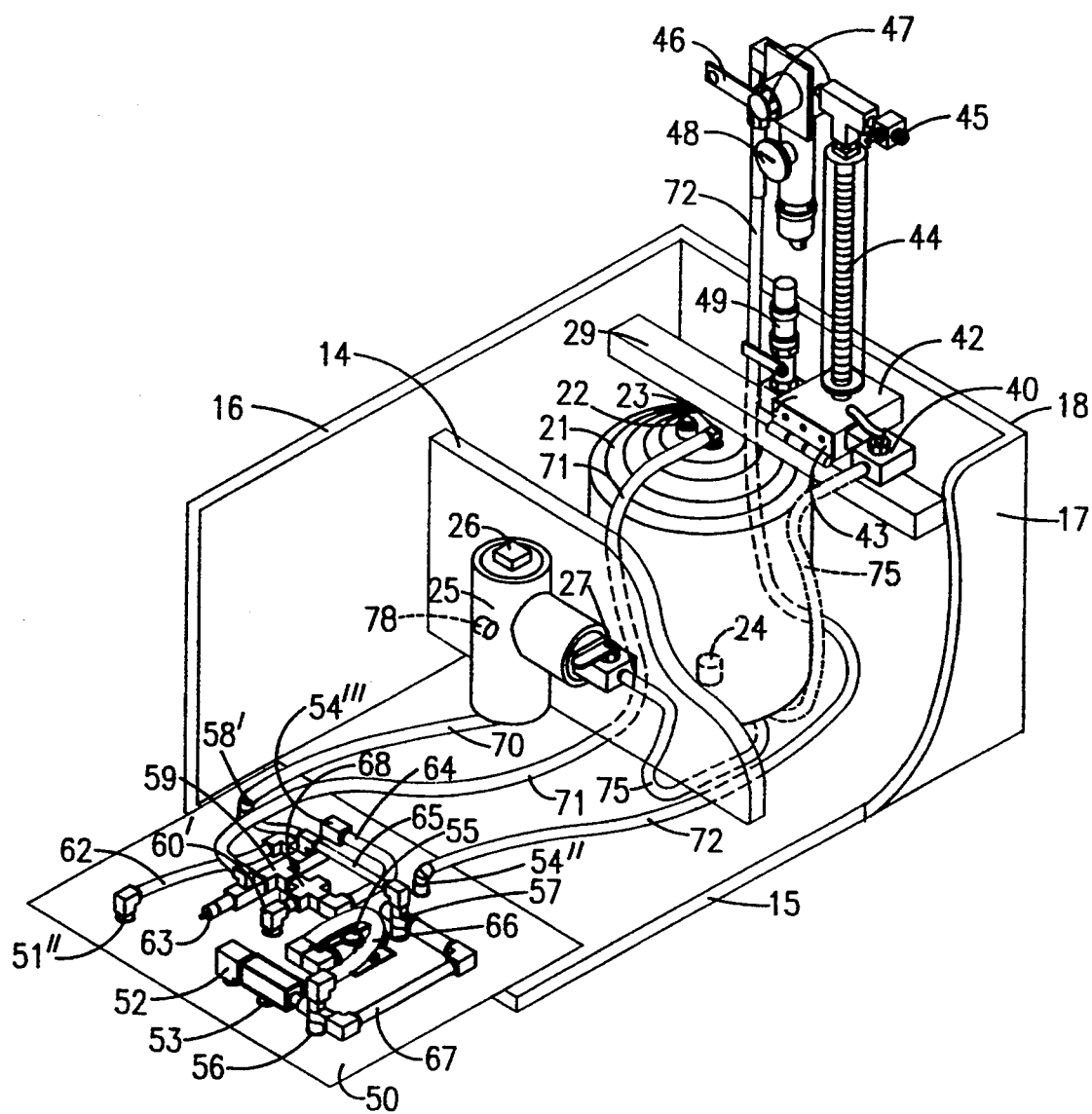
FIG. 3 is a top perspective view of the portable piping-and-pump-system testing apparatus with the calibrated cylinder operatively disposed.
Figure 4:
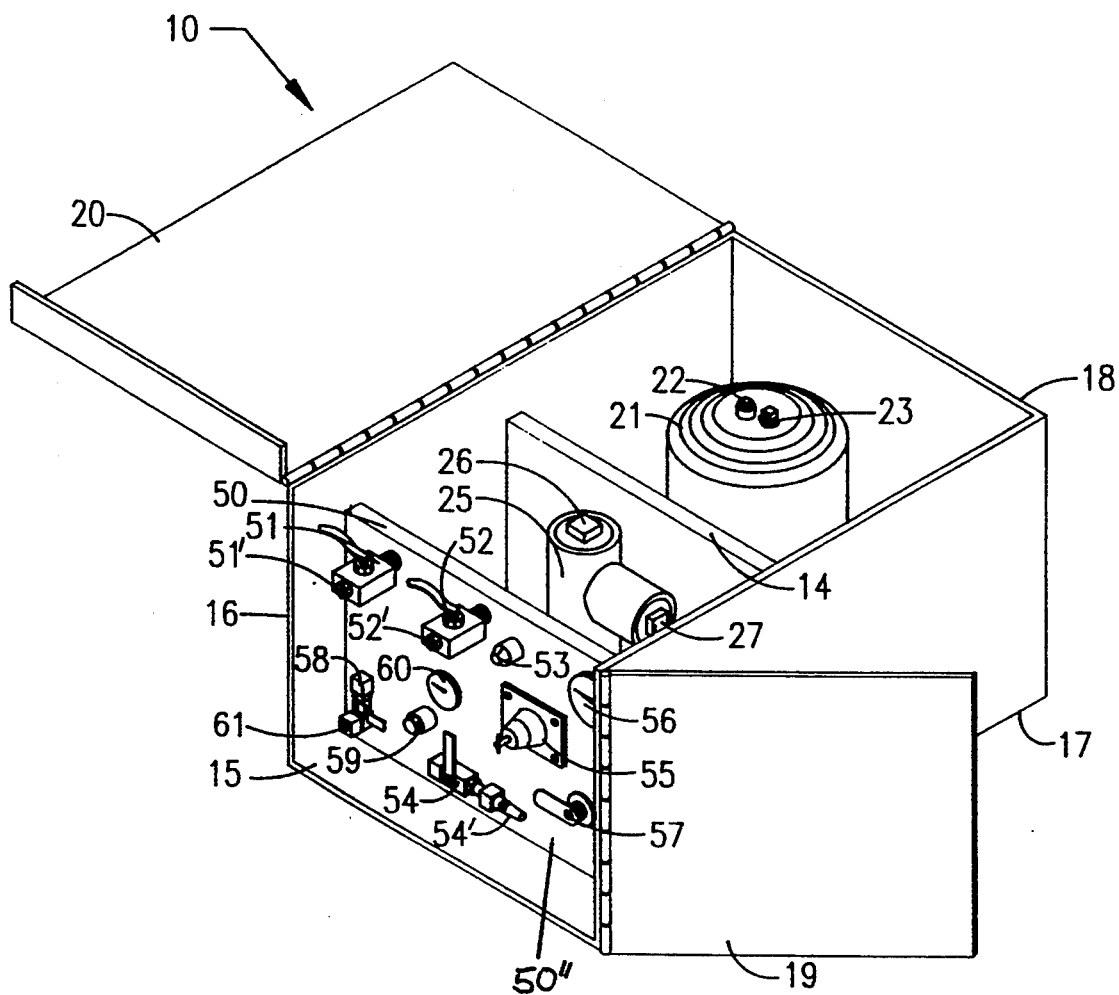
FIG. 4 is a top perspective view of the portable piping-and-pump-system testing apparatus with the cylinder assemblies removed from the cabinet.
Figure 5:
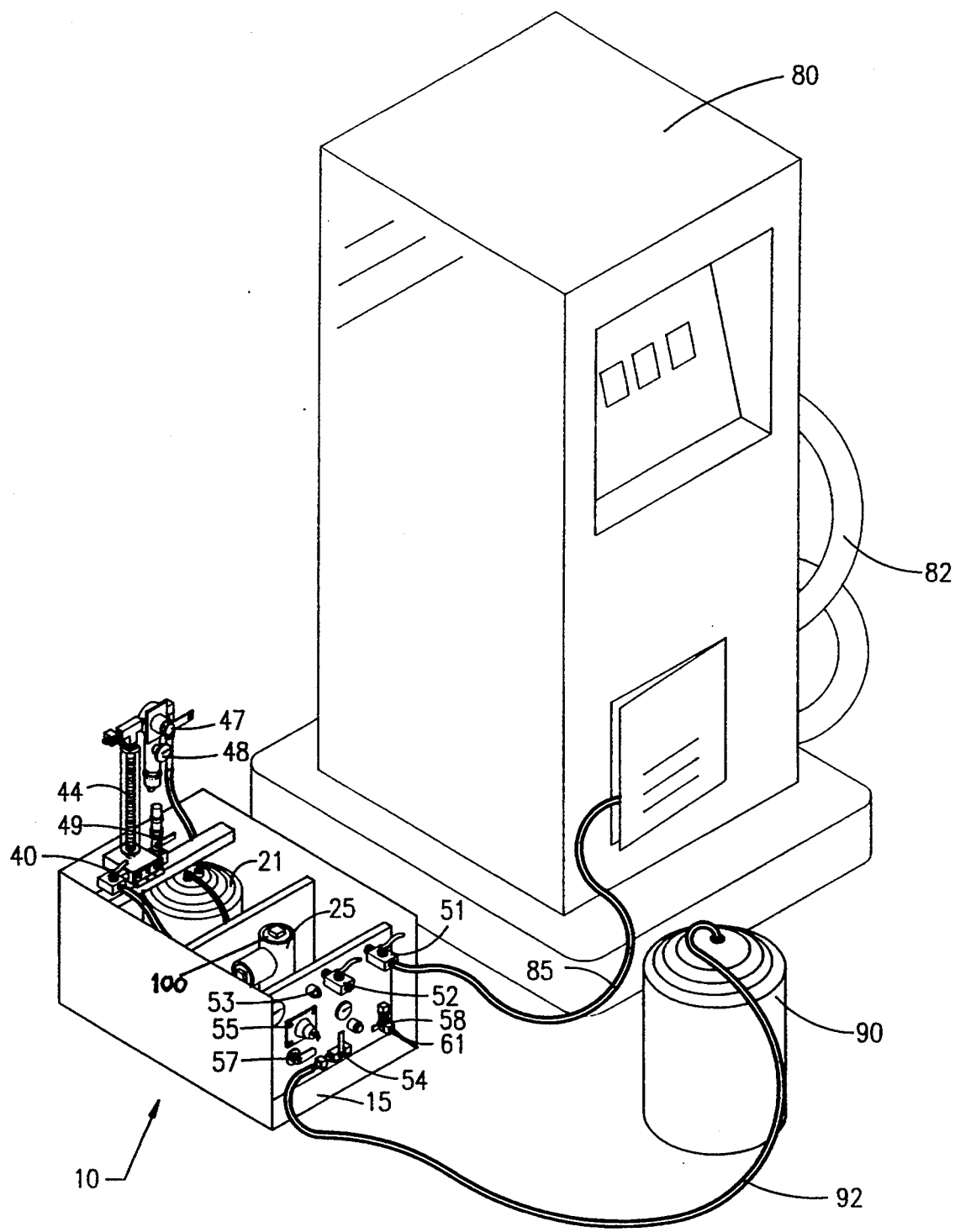
FIG. 5 is a perspective view of the portable piping-and-pump-system testing apparatus connected to a piping and pump system and to an outside gas source.

As shown in FIGS. 1, 3, & 5, an elongate bracket 29 is fixedly attached at its ends with bolts as such to the interior of the two side walls 16 & 17 of the cabinet 10 near the top thereof and near the back wall 18 of the cabinet 10. A base member 42 having a hollow interior is hinged along one edge thereof with a hinge member 43 fixedly mounted on top of the bracket 29 with screws or the like. A calibrated cylinder 44 being calibrated preferably in one hundred twenty five thousandths from 0.00000 to 0.06000 along the length thereof has a closed top end and a bottom end which extends into the top of the base member 42 into the hollow interior. The cylinder 44 extends longitudinally upward from the base member 42. A gas flow inlet valve 46 having a connection end, a gas flow regulator 47 which is fixedly connected to the gas flow inlet valve 46, and a gas pressure gauge 48 which is connected to the gas flow regulator 47 are securely mounted to the top end of the cylinder 44 to receive the gas preferably nitrogen being dispensed from an outside gas source 90, to regulate the gas, and to monitor the gas pressure entering the cylinder 44 which is pressurized to test for line leaks in the piping and pump system. A bleed off needle valve 45 is also mounted upon the calibrated cylinder 44 opposite the gas flow regulating and monitor means to purge air from the cylinder 44. A liquid flow inlet valve 40 having a connection end is connected to and extends into one side of the base member 42 into the hollow interior thereof to fill the cylinder 44 with liquid from the supply tank 21. A liquid flow outlet valve 49 having a connection end is connected to and extends into an opposite side of the base member 42 into the hollow interior thereof. A prong-shaped holder 79 is hingedly attached with screws or the like to the interior of the back wall 18 of the cabinet 10 and is aligned with the cylinder 44 so that the cylinder 44 is engageable between the prongs of the holder to hold the cylinder 44 in an upright or vertical operative position to conduct the test for line leaks in the piping and pump system. The cylinder 44 can be pivoted in a generally horizontal position parallel with the bottom wall 15 of the cabinet 10 when the tests are finished to facilitate closing of the lid 20 of the cabinet 10 and to facilitate portability of the piping-and-pump-system testing apparatus. Also, the bracket 29, cylinder 44, base means, and the valves connected thereto can be easily removed from the cabinet 10 if the user has no need to conduct tests for line leaks and is therefore an optional feature of this invention.

As shown in FIGS. 1 through 5, a control panel 50 is removeably attached to the side walls 16 & 17 inside the cabinet 10 and has a frontside 50' and a backside 50". The control panel 50 comprises a piping system connection valve 51 having a first connection end 51' attachable to a piping system connection hose 85 which is attachable to a dispenser 82 in the piping and pump system which contains the leakage detector being tested. The piping system connection valve 51 has a second connection end 51" which is disposed through the frontside 50' of the control panel 50 and extends out the backside 50" of the control panel 50. A first coupling hose 62 has one end which is attached to the second connection end 51" of the piping system connection valve 51 and has the opposite end attached to a T-coupler which is securely disposed on the backside 50" of the control panel 50. A second coupling hose 65 has an end connected to the T-coupler and has an opposite end connected to a first connection end 57' of a four-way valve 57, which is disposed through the backside 50" of the control panel 50 and extends out the frontside of the control panel 50. The T-coupler is also directly connected to a pressure release valve 63 which is securely fixed with fasteners to the backside 50" of the control panel 50 for bleeding air from the coupling hoses. A third coupling hose 67 has an end connected to a second connection end of the four-way valve 57 and has the opposite end connected to a liquid flow regulator 55 which is disposed through the backside 50" of the control panel 50 and extends out the frontside 50' of the control panel 50. Further, the liquid flow regulator 55 is fixedly coupled to an inline liquid flow pressure gauge 56 which is disposed through the backside 50" of the control panel 50 and is exposed on the frontside of the control panel 50 to measure the pressure of the liquid being used to simulate a leak for testing the leakage detector. A fourth coupling hose 66 connects the inline liquid flow pressure gauge 56 to a metering needle valve 53 which is also mounted upon and disposed through the frontside 50' of the control panel 50. The metering needle valve 53 is fixedly coupled to a liquid discharge valve 52 which has a connection end 52' exposed on the frontside 50' of the control panel 50. A gas valve 54 having a first connection end 54', a second connection end 54", and a third connection end 54 is mounted near the bottom on the frontside 50' of the control panel 50 with the first connection end 54' exposed on the frontside 50' and the second and third connection ends 54" & 54 disposed through the control panel 50 to the backside 50". The first connection end 54' of the gas valve 54 is attachable to a gas supply hose 92 which is attached or connected to an outside gas source 90. A gas hose 72 having one end attached to the second connection end 54″ of the gas valve 54 is connected to the gas flow inlet valve 46 on the cylinder 44. The third connection end 54 of the gas valve 54 is fixedly connected to a conduit member fixedly mounted to the backside 50″ of the control panel 50, the conduit member comprising a gas regulator 59 having a control knob rotatably mounted upon and disposed through the frontside 50′ of the control panel 50 into the conduit member and a inline gas flow pressure gauge 60 which is also disposed through the frontside 50′ of the control panel 50 into the conduit member which has a portion connected to an end of the gas inlet hose 71. A supply tank 21 valve having a first connection end 54′ exposed on the frontside 50′ of the control panel 50 is disposed upon and through the frontside 50′ and has a second connection end 54″ exposed on the backside 50″ of the control panel 50. The supply tank valve 58 is also coupled by a fifth coupling hose 64 to the four-way valve 57 to regulate flow of liquid to simulate a line leak for testing the leakage detector to make sure the leakage detector 100 is functionally detecting line leaks in the piping and pump system. The supply tank valve 58 is also coupled to a quick discharge valve 61 exposed on the frontside 50′ of the control panel 50.

As shown in FIG. 3, a leakage detector adapter comprising an adapter body 25 having a substantially hollow interior therein and an open top end and which is dimensioned to receive a leakage detector therein is securely mounted inside the cabinet 10 and securely fastened to the divider wall 14 of the cabinet 10. A plug member 26 is threadably inserted in the top end of the adapter body 25 and is removeable to open the top end of the adapter body 25 so that the leakage detector 100 can be mounted through the top end of the adapter body 25. An adapter bleed valve 78 extends in the side of the hollowed adapter body 25 for purging air from inside thereof, and an adapter inlet valve 27 having a connection end is disposed in the opposite side of the adapter body 25 to adjustably control liquid entering the adapter body 25 from the supply tank 21. The supply tank 21 hose is attachable to the connection end of the adapter inlet valve 27 to supply liquid from the supply tank 21 to test the leakage detector removed from the piping and pump system. An adapter body 25 hose is connected to the bottom of the adapter body 25 and extends and is detachably connected to a second connection end of the supply tank valve 58 disposed through the control panel 50 to allow liquid to leave the adapter body 25 to simulate a line leak to test the detection functionality of line leaks by the leakage detector as shown in FIG. 5.

To test for a line leak in a piping and pump system using the present invention, the user should (1) position the cabinet 10 near a dispenser for the piping and pump system; (2) open the lid 20 and front wall 19 of the cabinet 10; (3) pivot the cylinder 44 in an upright vertical position and secure the cylinder 44 with the prong-shaped holder; (4) turn off all power to all pumps in the line being tested; (5) strap down or disable all dispenser nozzles of the piping system being tested; (6) install a dry break in a test port plug hole at the bottom of the pump dispenser; (7) close all valves on the piping-and-pump-system testing apparatus; (8) connect a hose to the liquid inlet and bleed valve 22 disposed in the top of the supply tank 21 with comparable liquid to that in the piping and pump system; (9) connect one end of the piping system connection hose to the dry break; (10) connect the opposite end of the piping system connection hose to the cylinder 44 outlet valve and connector; (11) detachably connect one end of a gas supply hose 92 to the first connection end 54′ of the gas valve 54 disposed upon the frontside of the control panel 50; (12) detachably connect the opposite end of the gas supply hose 92 to a regulator on a pressurized gas tank; (13) open the gas valve 54 on the control panel 50 to pressurize the supply tank 21; (14) adjust the gas flow regulator on the control panel 50 to preferably 30 pounds per square inch; (15) open the bleed off needle valve 45 on top of the upright calibrated cylinder 44; (16) fill the calibrated cylinder 44 with liquid from the supply tank 21 by opening the liquid flow inlet valve 40 near the bottom of the calibrated cylinder 44; (17) close the liquid flow inlet valve 40 when the liquid in the calibrated cylinder 44 preferably reaches the 0.06000 calibrated mark on the cylinder 44; (18) close the bleed off needle valve 45 at the top of the calibrated cylinder 44; (19) open the gas flow inlet valve 46; (20) adjust the gas flow regulator 47 on the cylinder 44 to regulate the gas pressure entering the calibrated cylinder 44 to pressures up to 45 pounds per square inch for submerged pump systems in particular and up to 15 pounds per square inch for suction systems; (21) open the liquid flow outlet valve 49 to pressurize the piping system being tested; (22) record the liquid level in the cylinder 44 at 0 pounds per square inch and at the operating pressure selected; and (23) continue to record the liquid levels in cylinder 44 and the time to determine if there is a leak in the line in the piping and pump system.

To test the leakage detector in its own environment in the piping and pump system using the present invention, the user should (1) position the cabinet 10 near the dispenser farthest from the pump; (2) open the lid 20 and front wall 19 of the cabinet 10; (3) turn off the power to the piping and pump system; (4) tie off all dispenser nozzles in the system except for the dispenser nozzle farthest from the pump; (5) remove the test plug in the shear valve under the dispenser nozzle; (6) install the dry break into the test plug hole of the shear valve; (7) connect one end of the piping system connection hose to the dry break; (8) connect the opposite end of the piping system connection hose to the piping system connection valve on the frontside of the control panel 50; (9) restore power to the piping and pump system; (10) turn on the selected dispenser to actuate the pump; (11) connect one end of a flexible hose to the liquid discharge valve 52 and put the opposite end in a separate container; (12) turn the four-way valve 57 to the full flow position; (13) turn the metering needle valve 53 counterclockwise to the open position; (14) open the piping system connection valve to allow liquid from the piping and pump system to enter the piping system connection valve; (15) open the liquid discharge valve 52 to purge the system and then reclose the liquid discharge valve 52; (16) turn four-way valve 57 to allow liquid to the liquid flow regulator 55; (17) open liquid discharge valve 52 to purge the liquid flow regulator 55; (18) close the piping system connection valve; (19) close the metering needle valve 53; (20) turn the metering needle valve 53 counter clockwise about 6 revolutions to simulate a leak rate of approximately 3 GPH; (21) observe the liquid pressure gauge. If the liquid pressure gauge does not reach full pressure and stops at 8 to 13 pounds per square inch for a diaphragm type leakage detector or stops at 18 to 22 pounds per square inch for a piston type leakage detector, the leakage detector has sensed the leak and is functioning correctly.

To test a leakage detector in the adapter body 25 of the present invention, the user should (1) open the lid 20 and front wall 19 of the cabinet 10; (2) close all valves on the testing apparatus; (3) fill the supply tank 21 with comparable liquid to that being tested by connecting one end of a hose to the liquid inlet valve disposed in the stop of the supply tank 21 and connecting the other end to an outside liquid supply source; (4) remove the plug on the leakage detector adapter; (5) position the leakage detector in the top end of the leakage detector adapter; (6) connect one end of the gas supply hose 92 to the first connector end of the gas valve 54 on the frontside of the control panel 50 and connect the other end of the gas supply hose 92 to a gas source 90 preferably containing nitrogen; (7) turn the gas valve 54 to allow gas through the gas flow regulator 59 and the inline gas flow pressure gauge 60; (8) adjust the pressure of the gas to 30 pounds per square inch which will be the pressure in the supply tank 21; (9) open the supply tank 21 liquid outlet fitting 24 to dispense liquid from the supply tank 21; (10) open the adapter inlet valve 27 to allow liquid to enter from the supply tank 21; (11) open the adapter bleed valve 78 to purge air from the adapter body 25; (12) close the adapter bleed valve 78; (13) close the liquid discharge valve 52; (14) open the supply tank 21 valve on the control panel 50; (15) open the discharge valve; (16) turn the four-way valve 57 to allow liquid to flow through the liquid flow regulator 55; (17) adjust the liquid pressure to 10 pounds per square inch; (18) open the metering needle valve 53; (19) open the adapter inlet valve 27 to allow liquid into the leakage detector adapter from the supply tank 21; (20) observe the liquid pressure gauge. If the liquid pressure stops at 8 to 13 pounds per square inch for a diaphragm type leakage detector or stops at 18 to 22 pounds per square inch for a piston type leakage detector, the leak detector has sensed the leak and is functioning correctly.

Various changes and departures may be made to the invention without departing from the spirit and scope thereof. Accordingly, it is not intended that the invention be limited to that specifically described in the specification or as illustrated in the drawing but only as set forth in the claims.

What is claimed is:

1. A portable piping-and-pump-system testing apparatus comprising:
    a cabinet having a bottom wall, a back wall, two side walls, a hinged front wall, and a hinged lid;
    a supply tank having liquid inlet and outlet valves disposed therein and having a gas inlet valve and a gas inlet hose having an end connected to said gas inlet valve, said supply tank further having a liquid outlet hose having an end attached to said liquid outlet valve, said supply tank being securely mounted upon said bottom wall of said cabinet;
    a control panel having a frontside and a backside and being securely attached inside said cabinet near said front wall, said control panel having means to regulate and monitor testing of a leakage detector in a piping and pump system, said regulating and monitoring means disposed upon and through said control panel;
    a leakage detector adapter being fixedly mounted inside of said cabinet and having a hollow body dimensioned to receive said leakage detector and having an open top through which said leakage detector is positioned in said hollow body, said leakage detector adapter further having an adapter bleed valve disposed therein to purge air from said hollow body and further having an adapter inlet valve disposed therein, said adapter inlet valve attachable to the end of said liquid outlet hose, for receiving liquid from said supply tank to test said leakage detector, said leakage detector adapter also having an adapter hose connected thereto to allow said liquid in said hollow body to flow through a portion of said regulating and monitoring means of said control panel; and
    a means to test for line leaks in said piping and pump system.

2. A portable piping-and-pump-system testing apparatus comprising as described in claim 1, wherein said means to test for line leaks in said piping and pump system comprises
    a bracket fixedly attached to said side walls;
    a hollow base member being hingedly fastened upon said bracket;
    a calibrated cylinder having a bottom end disposed into said base member and a closed top end, said cylinder extending longitudinally from said base member and being pivotable with said base member either in an upright vertical testing position or in a generally horizontal non-testing position parallel with said bottom wall of said cabinet to facilitate closing of said lid for moveability of said cabinet;
    a holder member attached to said back wall of said cabinet to hold said cylinder in an upright vertical line-leak testing position; and
    a means to regulate inflow and outflow of gas and liquid into said cylinder to test for line leaks.

3. A portable piping-and-pump-system testing apparatus as described in claim 2, wherein said means to regulate said inflow and outflow of gas and liquid into said cylinder comprises a gas flow inlet valve, a gas flow regulator coupled to said gas flow inlet valve, and a bleed off valve, all securely mounted upon said top end of said cylinder and further comprises a liquid flow inlet valve connected to said base member to receive liquid from said supply tank to fill said cylinder and also comprises a liquid flow outlet valve also connected to said base member for purging said liquid from said cylinder, said gas flow inlet valve attachable to a gas hose to receive gas to pressurize said cylinder.

4. A portable piping-and-pump-system testing apparatus as described in claim 3, wherein said means to test said leakage detectors and test for line leaks further comprises a gas valve having a first connection end attachable to an end of a gas supply hose having an opposite end connected to gas source, said gas valve further having a second connection end and a third connection end on said backside of said control panel, said third connection end connected to said gas hose through which-gas is delivered to said cylinder.

5. A portable piping-and-pump-system testing apparatus as described in claim 4, wherein said means to test said leakage detectors and test for line leaks further comprises a gas flow regulator and a gas inline pressure gauge which are coupled to said gas inlet hose to adjustably control pressure of gas to said supply tank, said gas flow regulator also being coupled to said second connection end of said gas valve to receive said gas.

6. A portable piping-and-pump-system testing apparatus as described in claim 5, wherein said means to test said leakage detectors and test for line leaks further comprises a supply tank valve connected to said adapter hose to receive liquid from said leakage detector adapter.

7. A portable piping-and-pump-system testing apparatus as described in claim 6, wherein said means to test said leakage detectors and test for line leaks further comprises a four-way valve coupled to said supply tank valve, a liquid flow regulator coupled to said four-way valve, a liquid inline pressure gauge coupled to said liquid flow regulator, a metering needle valve coupled to said liquid inline pressure gauge, and a liquid discharge valve coupled to said metering needle valve to simulate a line leak to test said leakage detector either in said piping or pump system or in said leakage detector adapter.

8. A portable piping-and-pump-system testing apparatus as described in claim 7, wherein said means to test said leakage detectors and test for line leaks further comprises a piping system connection valve coupled to said four-way valve and being attachable to a piping system connection hose which is attachable to said piping and pump system, for receiving liquid from said piping and pump system to test said leakage detector by simulating a line leak.

9. A portable piping-and-pump-system testing apparatus as described in claim 5, wherein said means to test said leakage detectors and test for line leaks further comprises a supply tank discharge valve attachable to an end of said liquid outlet hose to purge liquid from said supply tank upon completion of said tests.

* * * * *